United States Patent
Anderson et al.

(10) Patent No.: US 12,462,406 B2
(45) Date of Patent: Nov. 4, 2025

(54) SYSTEMS AND METHODS FOR SLIDE IMAGE ALIGNMENT

(71) Applicant: H. LEE MOFFITT CANCER CENTER AND RESEARCH INSTITUTE, INC., Tampa, FL (US)

(72) Inventors: Alexander Anderson, Tampa, FL (US); Mark Robertson-Tessi, Lutz, FL (US); Chandler Gatenbee, Tampa, FL (US)

(73) Assignee: H. LEE MOFFITT CANCER CENTER AND RESEARCH INSTITUTE, INC., Tampa, FL (US)

( * ) Notice: Subject to any disclaimer, the term of this patent is extended or adjusted under 35 U.S.C. 154(b) by 571 days.

(21) Appl. No.: 17/609,922

(22) PCT Filed: May 11, 2020

(86) PCT No.: PCT/US2020/032321
§ 371 (c)(1),
(2) Date: Nov. 9, 2021

(87) PCT Pub. No.: WO2020/227710
PCT Pub. Date: Nov. 12, 2020

(65) Prior Publication Data
US 2022/0237810 A1    Jul. 28, 2022

Related U.S. Application Data

(60) Provisional application No. 62/845,585, filed on May 9, 2019.

(51) Int. Cl.
G06T 7/33    (2017.01)
G06T 3/14    (2024.01)
(Continued)

(52) U.S. Cl.
CPC ............ *G06T 7/337* (2017.01); *G06T 3/14* (2024.01); *G06T 3/4038* (2013.01); *G06V 10/24* (2022.01);
(Continued)

(58) Field of Classification Search
CPC ......... G06T 7/337; G06T 3/14; G06T 3/4038; G06T 2207/30024; G06T 7/33;
(Continued)

(56) References Cited

U.S. PATENT DOCUMENTS

2008/0033657 A1    2/2008  Cline et al.
2010/0215227 A1    8/2010  Grunkin et al.
(Continued)

FOREIGN PATENT DOCUMENTS

DE    19754909 C2 *  6/2001  ............ G06T 5/009

OTHER PUBLICATIONS

D. Motta, W. Casaca and A. Paiva, "Fundus Image Transformation Revisited: Towards Determining More Accurate Registrations," 2018 IEEE 31st International Symposium on Computer-Based Medical Systems (CBMS), Karlstad, Sweden, 2018, pp. 227-232, doi: 10.1109/CBMS.2018.00047. (Year: 2018).*
(Continued)

*Primary Examiner* — Matthew C Bella
*Assistant Examiner* — Janice E. Vaz
(74) *Attorney, Agent, or Firm* — Meunier Carlin & Curfman LLC

(57) ABSTRACT

Systems and methods for slide image alignment are described herein. An example method includes receiving a plurality of slide images, detecting a plurality of features contained in the slide images, and comparing a plurality of pairs of the slide images. The comparison uses the detected features. The method also includes creating a distance matrix that reflects a respective difference between each of
(Continued)

the pairs of the slide images, creating a graph by connecting each of the slide images to its most similar slide image, and detecting a plurality of graph components. Each of the graph components includes one or more of the slide images. The method further includes aligning the slide images within each of the graph components, and aligning the graph components to form a composite image.

19 Claims, 7 Drawing Sheets

(51) Int. Cl.
| | |
|---|---|
| G06T 3/4038 | (2024.01) |
| G06V 10/24 | (2022.01) |
| G06V 10/74 | (2022.01) |
| G06V 10/75 | (2022.01) |
| G06V 10/762 | (2022.01) |
| G06V 20/69 | (2022.01) |

(52) U.S. Cl.
CPC .......... *G06V 10/751* (2022.01); *G06V 10/761* (2022.01); *G06V 10/7625* (2022.01); *G06V 20/695* (2022.01); *G06T 2207/30024* (2013.01)

(58) Field of Classification Search
CPC ........ G06T 7/38; G06V 10/24; G06V 10/751; G06V 10/761; G06V 10/7625; G06V 20/695; G02B 21/365
See application file for complete search history.

(56) References Cited

U.S. PATENT DOCUMENTS

| | | | | |
|---|---|---|---|---|
| 2015/0131882 | A1 | 5/2015 | Mohr et al. | |
| 2015/0154755 | A1* | 6/2015 | Wang | G06V 20/698 382/162 |
| 2016/0019695 | A1* | 1/2016 | Chukka | G06T 7/0014 382/128 |
| 2016/0341731 | A1* | 11/2016 | Sood | G16B 40/00 |
| 2017/0091937 | A1* | 3/2017 | Barnes | G06V 10/771 |
| 2020/0143542 | A1* | 5/2020 | Barnes | G06T 11/60 |
| 2021/0364535 | A1* | 11/2021 | Rhodes | G01N 1/312 |
| 2022/0139072 | A1* | 5/2022 | Klaiman | G06V 10/82 382/159 |

OTHER PUBLICATIONS

Sakai R, Winand R, Verbeiren T, Moere AV, Aerts J. dendsort: modular leaf ordering methods for dendrogram representations in R. F1000Res. Jul. 30, 2014;3:177. doi: 10.12688/f1000research.4784. 1. PMID: 25232468; PMCID: PMC4162509. (Year: 2014).*
Sanchez-Morillo et al. "Classification of breast cancer Histopathological Images using Kaze features and Bag of Features" Springer-Verlag Berlin Heidelberg. Dec. 31, 2018. (Year: 2018).*
International Search Report and Written Opinion in PCT/US20/32321. Mailed Jul. 29, 2020. 9 pages.
Sanchez-Morillo et al. "Classification of breast cancer Histopathological Images using Kaze features and Bag of Features" Springer-Verlag Berlin Heidelberg. Dec. 31, 2018.
Pablo Fernández Alcantarilla, Adrien Bartoli, and Andrew J. Davison. Kaze features. In Andrew Fitzgibbon, Svetlana Lazebnik, Pietro Perona, Yoichi Sato, and Cordelia Schmid, editors, Computer Vision—ECCV 2012, pp. 214-227, Berlin, Heidelberg, 2012. Springer Berlin Heidelberg. ISBN 978-3-642-33783-3.
Ziv Bar-Joseph, David K. Gifford, and Tommi S. Jaakkola. Fast optimal leaf ordering for hierarchical clustering. Bioinformatics, 17(suppl_1):S22-S29, Apr. 20, 2020 2001. doi: 10.1093/bioinformatics/17.suppl_1.S22. URL https://doi.org/10.1093/bioinformatics/17.suppl1:S22.
Blondel, Vincent D., et al. Fast unfolding of communities in large networks. Journal of statistical mechanics: theory and experiment 2008.10 (2008): P10008.
Martin A. Fischler and Robert C. Bolles. Random sample consensus: A paradigm for model fitting with applications to image analysis and automated cartography. Commun. ACM, 24(6):381-395, Jun. 1981. ISSN 0001-0782. doi: 10.1145/358669.358692. URL https://doi.org/10.1145/358669.358692.
Ching-Wei Wang, Shuk-Man Ka, and Ann Chen. Robust image registration of biological microscopic images. Scientific Reports, 4:6050 EP-, Aug. 2014. URL https://doi.org/10.1038/srep06050.
P. Weinzaepfel, J. Revaud, Z. Harchaoui, and C. Schmid. Deepflow: Large displacement optical flow with deep matching. In 2013 IEEE International Conference on Computer Vision, pp. 1385-1392, 2013. ISBN 1550-5499. doi: 10.1109/ICCV.2013.175.
Gatenbee, Chandler D., et al. "Niche engineering drives early passage through an immune bottleneck in progression to colorectal cancer." bioRxiv (2019): 623959.
International Preliminary Report on Patentability issued for Application No. PCT/US2020/032321, dated Nov. 18, 2022.
International Preliminary Report on Patentability issued for Application No. PCT/US2020/032321, dated Nov. 18, 2021.
International Search Report and Written Opinion issued for Application No. PCT/US2022/049194, dated Mar. 20, 2023.
Angelo, M., Bendall, S. C., Finck, R., Hale, M. B., Hitzman, C., Borowsky, A. D., . . . Nolan, G. P. (2014). Multiplexed ion beam imaging of human breast tumors. Nat Med, 20(4), 436-442. doi:10.1038/nm.3488.
Arganda-Carreras, I., Sorzano, C. O. S., Marabini, R., Carazo, J. M., Ortiz-de-Solorzano, C., & Kybic, J. (2006, 2006//). Consistent and Elastic Registration of Histological Sections Using Vector-Spline Regularization. Paper presented at the Computer Vision Approaches to Medical Image Analysis, Berlin, Heidelberg.
Baddeley, A., Rubak, E., & Turner, R. (2015). Spatial Point Patterns: Methodology and Applications with R. London: Chapman and Hall/CRC Press.
Bankhead, P., Loughrey, M. B., Fernandez, J. A., Dombrowski, Y., McArt, D. G., Dunne, P. D., . . . Hamilton, P. W. (2017). QuPath: Open source software for digital pathology image analysis. Sci Rep, 7(1), 16878. doi:10.1038/s41598-017-17204-5.
Besag, J. (1977). Discussion of Dr Ripley's paper. Journal of the Royal Statistical Society. Series B (Methodological), 39, 193-195.
Borovec, J., Kybic, J., Bušta, M., Ortiz-de-Solórzano, C., & Muñoz-Barrutia, A. (2013, Apr. 7-11, 2013). Registration of multiple stained histological sections. Paper presented at the 2013 IEEE 10th International Symposium on Biomedical Imaging.
Borovec, J., Muñoz-Barrutia, A., & Kybic, J. (2018). Benchmarking of Image Registration Methods for Differently Stained Histological Slides.
Crum, W. R., Hartkens, T., & Hill, D. L. (2004). Non-rigid image registration: theory and practice. Br J Radiol, 77 Spec No. 2, S140-153. doi:10.1259/bjr/25329214.
Deniz, O., Toomey, D., Conway, C., & Bueno, G. (2015). Multi-stained whole slide image alignment in digital pathology. Progress in Biomedical Optics and Imaging—Proceedings of SPIE, 9420. doi:10.1117/12.2082256.
Diggle, P. J. (1986). Displaced amacrine cells in the retina of a rabbit: analysis of a bivariate spatial point pattern. Journal of Neuroscience Methods, 18(1), 115-125. doi:https://doi.org/10.1016/0165-0270(86)90115-9.
Du Bois d'Aische, A., Craene, M. D., Geets, X., Gregoire, V., Macq, B., & Warfield, S. K. (2005). Efficient multi-modal dense field non-rigid registration: alignment of histological and section images. Med Image Anal, 9(6), 538-546. doi:10.1016/j.media.2005.04.003.
Fischler, M. A., & Bolles, R. C. (1981). Random sample consensus: a paradigm for model fitting with applications to image analysis and automated cartography. Commun. ACM, 24(6), 381-395. doi:10.1145/358669.358692.
Gallaher, J. A., Enriquez-Navas, P. M., Luddy, K. A., Gatenby, R. A., & Anderson, A. R. A. (2018). Spatial Heterogeneity and Evolutionary Dynamics Modulate Time to Recurrence in Continuous and Adaptive Cancer Therapies. Cancer Res, 78(8), 2127-2139. doi:10.1158/0008-5472.CAN-17-2649.

(56) References Cited

OTHER PUBLICATIONS

Gatenbee, Chandler D., et al. "Immunosuppressive niche engineering at the onset of human colorectal cancer." *Nature Communications* 13.1 (2022): 1798.

Gatenbee, C. D., Minor, E. S., Slebos, R. J. C., Chung, C. H., & Anderson, A. R. A. (2020). Histoecology: Applying Ecological Principles and Approaches to Describe and Predict Tumor Ecosystem Dynamics Across Space and Time. Cancer Control, 27(3), 1073274820946804. doi:10.1177/1073274820946804.

Gerdes, M. J., Sevinsky, C. J., Sood, A., Adak, S., Bello, M. O., Bordwell, A., . . . Ginty, F. (2013). Highly multiplexed single-cell analysis of formalin-fixed, paraffin-embedded cancer tissue. Proc Natl Acad Sci U S A, 110(29), 11982-11987. doi:10.1073/pnas.1300136110.

Giesen, C., Wang, H. A., Schapiro, D., Zivanovic, N., Jacobs, A., Hattendorf, B., . . . Bodenmiller, B. (2014). Highly multiplexed imaging of tumor tissues with subcellular resolution by mass cytometry. Nat Methods, 11(4), 417-422. doi:10.1038/nmeth.2869.

Gohlke, C. (2021). tifffile. Laboratory for Fluorescence Dynamics, University of California, Irvine.

Goldberg, I. G., Allan, C., Burel, J. M., Creager, D., Falconi, A., Hochheiser, H., . . . Swedlow, J. R. (2005). The Open Microscopy Environment (OME) Data Model and XML file: open tools for informatics and quantitative analysis in biological imaging. Genome Biol, 6(5), R47. doi:10.1186/GB-2005-6-5-r47.

Goltsev, Y., Samusik, N., Kennedy-Darling, J., Bhate, S., Hale, M., Vazquez, G., . . . Nolan, G. P. (2018). Deep Profiling of Mouse Splenic Architecture with CODEX Multiplexed Imaging. Cell, 174(4), 968-981 e915. doi:10.1016/j.cell.2018.07.010.

Goode, A., Gilbert, B., Harkes, J., Jukic, D., & Satyanarayanan, M. (2013). OpenSlide: A vendor-neutral software foundation for digital pathology. Journal of Pathology Informatics, 4(1), 27-27. doi:10.4103/2153-3539.119005.

Heindl, A., Sestak, I., Naidoo, K., Cuzick, J., Dowsett, M., & Yuan, Y. (2018). Relevance of Spatial Heterogeneity of Immune Infiltration for Predicting Risk of Recurrence After Endocrine Therapy of $ER_+$ Breast Cancer. JNCI: Journal of the National Cancer Institute, 110(2), 166-175. doi:10.1093/jnci/djx137.

Hennig, C., Adams, N., & Hansen, G. (2009). A versatile platform for comprehensive chip-based explorative cytometry. Cytometry A, 75(4), 362-370. doi:10.1002/cyto.a.20668.

Hijmans, R. J., Phillips, S., Leathwick, J., & Elith, J. (2017). dismo: Species Distribution Modeling. Retrieved from https://CRAN.R-project.org/package=dismo.

Khan, A. M., Rajpoot, N., Treanor, D., & Magee, D. (2014). A Nonlinear Mapping Approach to Stain Normalization in Digital Histopathology Images Using Image-Specific Color Deconvolution. IEEE Transactions on Biomedical Engineering, 61(6), 1729-1738. doi:10.1109/TBME.2014.2303294.

Kiemen, A., Braxton, A., Grahn, M., Han, K. S., Babu, J. M., Reichel, R., . . . Wirtz, D. (2020). In situ characterization of the 3D microanatomy of the pancreas and pancreatic cancer at single cell resolution: bioRxiv.

Klein, S., Staring, M., Murphy, K., Viergever, M. A., & Pluim, J. P. (2010). elastix: a toolbox for intensity-based medical image registration. IEEE Trans Med Imaging, 29(1), 196-205. doi:10.1109/TMI.2009.2035616.

Kybic, J., & Borovec, J. (2014). Automatic Simultaneous Segmentation and fast Registration of histological images.

Kybic, J., Dolejí, M., & Borovec, J. (2015). Fast registration of segmented images by normal sampling.

Levy, J. J., Jackson, C. R., Haudenschild, C. C., Christensen, B. C., & Vaickus, L. J. (2020). PathFlow-MixMatch for Whole Slide Image Registration: An Investigation of a Segment-Based Scalable Image Registration Method. bioRxiv, 2020.2003.2022.002402. doi:10.1101/2020.03.22.002402.

Lewis, S. M., Asselin-Labat, M. L., Nguyen, Q., Berthelet, J., Tan, X., Wimmer, V. C., . . . Naik, S. H. (2021). Spatial omics and multiplexed imaging to explore cancer biology. Nat Methods, 18(9), 997-1012. doi:10.1038/s41592-021-01203-6.

Li, C., Li, Z., Wang, Z., Xu, Y., Luo, M. R., Cui, G., . . . Pointer, M. (2017). Comprehensive color solutions: CAM16, CAT16, and CAM16-UCS. Color Research & Application, 42(6), 703-718. doi:https://doi.org/10.1002/col.22131.

Li, Liyuan, et al. "Foreground object detection from videos containing complex background." *Proceedings of the eleventh ACM international conference on Multimedia.* 2003.

Linkert, M., Rueden, C. T., Allan, C., Burel, J. M., Moore, W., Patterson, A., . . . Swedlow, J. R. (2010). Metadata matters: access to image data in the real world. J Cell Biol, 189(5), 777-782. doi:10.1083/jcb.201004104.

Lowekamp, B. C., Chen, D. T., Ibanez, L., & Blezek, D. (2013). The Design of SimpleITK. Front Neuroinform, 7, 45. doi:10.3389/fninf.2013.00045.

Maley, C. C., Koelble, K., Natrajan, R., Aktipis, A., & Yuan, Y. (2015). An ecological measure of immune-cancer colocalization as a prognostic factor for breast cancer. Breast Cancer Res, 17(1), 131. doi:10.1186/s13058-015-0638-4.

Marstal, K., Berendsen, F., Staring, M., & Klein, S. (2016, Jun. 26-Jul. 1, 2016). SimpleElastix: A User-Friendly, Multi-lingual Library for Medical Image Registration. Paper presented at the 2016 IEEE Conference on Computer Vision and Pattern Recognition Workshops (CVPRW).

Martinez, K., & Cupitt, J. (2005). VIPS—a highly tuned image processing software architecture. Paper presented at the IEEE International Conference on Image Processing (Aug. 31, 2005). https://eprints.soton.ac.uk/262371/.

Muhlich, J., Chen, Y .- A., Russell, D., & Sorger, P. K. (2021). Stitching and registering highly multiplexed whole slide images of tissues and tumors using ASHLAR software. bioRxiv, 2021.2004.2020.440625. doi:10.1101/2021.04.20.440625.

Obando, D. F. G., Frafjord, A., Øynebråten, I., Corthay, A., Olivo-Marin, J., & Meas-Yedid, V. (2017, Apr. 18-21, 2017). Multi-staining registration of large histology images. Paper presented at the 2017 IEEE 14th International Symposium on Biomedical Imaging (ISBI 2017).

Paknezhad, M., Loh, S. Y. M., Choudhury, Y., Koh, V. K. C., Yong, T. T. K., Tan, H. S., . . . Lee, H. K. (2020). Regional registration of whole slide image stacks containing major histological artifacts. BMC Bioinformatics, 21(1), 558. doi:10.1186/s12859-020-03907-6.

Popovic, G. C., Warton, D. I., Thomson, F. J., Hui, F. K. C., & Moles, A. T. (2019). Untangling direct species associations from indirect mediator species effects with graphical models. Methods in Ecology and Evolution, 10(9), 1571-1583. doi:10.1111/2041-210X.13247.

R Core Team. (2019). R: A Language and Environment for Statistical Computing. Vienna, Austria: R Foundation for Statistical Computing. Retrieved from https://www.R-project.org/.

Ripley, B. D. (1977). Modelling Spatial Patterns. Journal of the Royal Statistical Society. Series B (Methodological), 39(2), 172-212.

Shamonin, D. P., Bron, E. E., Lelieveldt, B. P., Smits, M., Klein, S., Staring, M., & Alzheimer's Disease Neuroimaging, I. (2013). Fast parallel image registration on CPU and GPU for diagnostic classification of Alzheimer's disease. Front Neuroinform, 7, 50. doi:10.3389/fninf.2013.00050.

Simonyan, K., Vedaldi, A., & Zisserman, A. (2014). Learning Local Feature Descriptors Using Convex Optimisation. IEEE Transactions on Pattern Analysis and Machine Intelligence, 36(8), 1573-1585. doi:10.1109/TPAMI.2014.2301163.

Song, Y., Treanor, D., Bulpitt, A. J., & Magee, D. R. (2013). 3D reconstruction of multiple stained histology images. J Pathol Inform, 4(Suppl), S7. doi:10.4103/2153-3539.109864.

Traag, V. A., Waltman, L., & van Eck, N. J. (2019). From Louvain to Leiden: guaranteeing well-connected communities. Sci Rep, 9(1), 5233. doi:10.1038/s41598-019-41695-z.

* cited by examiner

ALIGNMENT ACCURACY

| | STAINS PER SLICE | N SLICES PER SAMPLE | N SAMPLS | IMAGE SHAPE (WxH) | SHAPE OF IMAGE ANALYZED | DISTANCE BETWEEN SLICES | MEDIAN ERROR (px) |
|---|---|---|---|---|---|---|---|
| CRA WHOLE MOUNT | 2 | 7 | 30 | 408 x 914 | 104568 x 234042 | 2μm | 2.1 |
| CRC WHOLE MOUNT | 2 | 7 | 15 | 408 x 914 | 104568 x 234042 | 2μm | 2.5 |
| DCIS WHOLE MOUNT | 2 | 7 | 48 | 408 x 914 | 104568 x 234042 | 2μm | 2.3 |
| BREAST TMA (N CORES) | 1 | 2 | 1 | 632 x 837 | | | 0.8 |
| ORAL TMA (N CORES) | 1 | 9 | 1 | 632 x 837 | | | 5 |
| RENAL ROI | 1 | 39 | 1 | 194 x 300 | 300 x 505 | | 1.8 |
| DCIS WHOLE MOUNT | 1 | 13 | 1 | 483 x 651 | 19334 x 26033 | 10μm | 4.3 |
| HNSCC | 1 | 69 (4 PANELS, 17 STAIN/WASH CYCLES PER PANEL) | 1 | 500 x 296 | | | 0.64 |

FIG. 3

| parameter | meaning |
| --- | --- |
| $I$ | set of unaligned images |
| $J$ | set of aligned images |
| $n$ | number of images in $I$ and $J$ |
| $I_i$ | $i^{th}$ image from $I$ |
| $J_i$ | $i^{th}$ aligned image from $J$ |
| $F_i$ | features for image $I_i$ |
| $F_i(x, y)$ | original position of the features in $I_i$ |
| $\dot{F}_i(x, y)$ | position of features after padding $I_i$ |
| $\tilde{F}_i(x, y)$ | position of features after community alignment |
| $\ddot{F}_i(x, y)$ | position of features after community stitching |
| $D$ | $n \times n$ image distance matrix |
| $d_{ij}$ | distance between image $I_i$ and $I_j$ |
| $s_{ij}$ | similarity between image $I_i$ and $I_j$ |
| $T$ | dendrogram produced by hierarchical clustering of $D$ |
| $\phi$ | optimal order of images in $I$ |
| $G(V, E)$ | nearest neighbor graph of images |
| $m$ | number of communities in $G(V, E)$ |
| $C_m$ | $m^{th}$ community in $G(V, E)$ |
| $I_k^m$ | training image for community $C_m$ |
| $F_k^m$ | features from $I_k^m$ that are found in all images of $C_m$ |
| $F_m$ | composite feature set for $C_m$ |
| $P_i$ | translation matrix to pad $I_i$ |
| $A_i^m$ | transformation matrix aligns $I_i$ to other images in $C_m$ |
| $\dot{A}_i$ | transformation matrix to roughly align $I_i$ to $I_{i-1}$ |
| $A_i$ | final transformation matrix to align $I_i$ to $I_{i-1}$ |

FIG. 5

SYSTEMS AND METHODS FOR SLIDE IMAGE ALIGNMENT

CROSS-REFERENCE TO RELATED APPLICATIONS

This application is a national stage application filed under 35 U.S.C. § 371 of PCT/US2020/032321 filed May 11, 2020, which claims the benefit of U.S. provisional patent application No. 62/845,585, filed on May 9, 2019, and entitled "SYSTEMS AND METHODS FOR SLIDE IMAGE REGISTRATION," the disclosure of which is expressly incorporated herein by reference in its entirety.

STATEMENT REGARDING FEDERALLY FUNDED RESEARCH

This invention was made with government support under Grant no. CA143970 and CA193489 awarded by the National Institutes of Health. The government has certain rights in the invention.

BACKGROUND

Aligning immunohistochemistry (IHC) is challenging for one or more of the following reasons: (1) the intensity of each pixel is different across slide images due to varying spatial distributions of the cells that carry the markers stained for; (2) the shape of the tissue changes as one moves "through" the sample; (3) samples may be distorted due to tearing or folding; and/or (4) the order of slices may not be known. Conventional methods tend to focus on small regions of interest (ROI), single stains, or a limited number of slides.

SUMMARY

Systems and methods for slide image alignment are described herein. An example computer-implemented method for slide image registration is described herein. The method includes receiving a plurality of slide images, detecting a plurality of features contained in the slide images, and comparing a plurality of pairs of the slide images. The comparison uses the detected features. The method also includes creating a distance matrix that reflects a respective difference between each of the pairs of the slide images, creating a graph by connecting each of the slide images to its most similar slide image, and detecting a plurality of graph components. Each of the graph components includes one or more of the slide images. The method further includes aligning the slide images within each of the graph components, and aligning the graph components to form a composite image.

Optionally, the detected features are KAZE features.

Alternatively or additionally, the step of comparing a plurality of pairs of the slide images includes comparing each one of the slide images to each of the other slide images. The comparison is used to create the distance matrix.

Optionally, the method further includes sorting the distance matrix by performing hierarchical clustering, for example, to yield a dendrogram. The dendrogram includes a plurality of leaves, each leaf corresponding to one of the slide images. Optionally, the method further includes performing optimal leaf ordering on the dendrogram.

Alternatively or additionally, the step of aligning the slide images within each of the graph components includes aligning two or more slide images within a graph component using at least one feature shared by the two or more slide images within the graph component.

Alternatively or additionally, the step of aligning the graph components to form a composite image includes pooling a respective set of features belonging to each of the graph components, and aligning two or more of the graph components using the respective sets of features belonging to the two or more of the graph components.

Alternatively or additionally, the method optionally further includes refining the alignment of the slide images.

Alternatively or additionally, the method further includes determining a transformation matrix for aligning the slide images. The step of determining the transformation matrix optionally includes selecting the transformation matrix from a plurality of transformation matrices, the selected transformation matrix having the lowest alignment error. The method can further include aligning one or more of the slide images using the transformation matrix.

Alternatively or additionally, the method further includes pre-processing the slide images. In some implementations, the step of pre-processing the slide images can include normalizing an RGB slide image, and converting the RGB slide image to greyscale. In other implementations, the step of pre-processing the slide images can include converting an RGB slide image into a YUV colorspace.

Optionally, the slide images are whole slide images of tissue slices. Alternatively or additionally, the whole slide images include images of tissue slices immunostained for different markers. Alternatively or additionally, the slide images are images of tissue stained with hematoxylin and eosin (H&E) stain. Alternatively or additionally, the slide images are images of tissue stained with multiple colors. Alternatively or additionally, the slide images are images of tissue that has undergone a plurality of stain and wash cycles.

Optionally, the slide images are an unordered set of slide images.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 3 is a table including the alignment accuracy of a slide alignment method (i.e., VALIS) according to an implementation described herein.

FIG. 5 is a table including definitions for variables used in the description of an example method (i.e., VALIS) according to an implementation described herein.

DETAILED DESCRIPTION

Figure 1A:
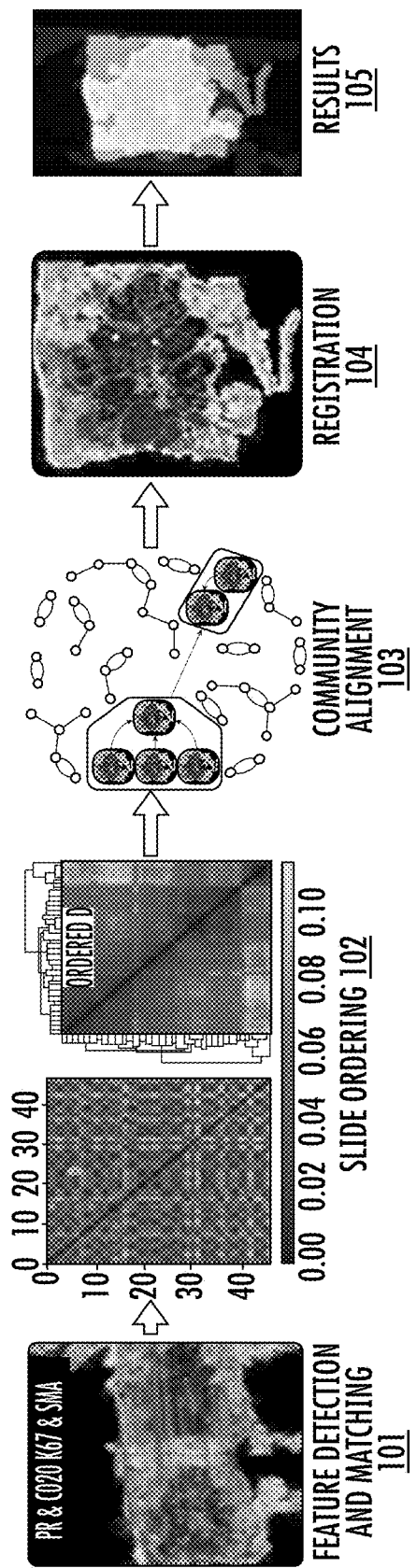
FIG. 1A is a flowchart illustrating a method for aligning slide images according to an implementation described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Tumor biopsies are often cut into a series of very thin slices, each of which is placed upon a slide. Stains may be applied to each slice, revealing the different cell types within the slice. Knowledge of the spatial location of cell types can be highly informative, as the location reveals how cells are interacting with one another, and/or if cells are isolated to certain regions of the tumor. Unfortunately, the location and orientation of the slices often varies across the slides upon which the slices are placed. As such, conducting a spatial analysis is only possible if the slices have been aligned in space. This would be extremely tedious to do manually. The technique described herein provides a solution that overcomes one or more of the difficulties noted above. The technique described herein provides an automated way in which to align the slices. The technique can be used align images of any size, from small pieces of tissue to the whole slice. The technique is also able to align a large number of serial slices, potentially allowing for three-dimensional (3D) reconstruction of the tumor. Further, the technique is able to align slices which have been stained for different cell types, allowing one to get a better picture of the cellular composition of the tumor. Given these features, the technique enables one to conduct a spatial analysis and/or reconstruct the tumor in 3D.

An example method for performing whole slide image registration (WISR) for immunohistochemistry (IHC) is described herein. An example method for analyzing slide images is also described herein. The method can include aligning a plurality of slide images to form a composite image. Alternatively or additionally, the method can further include slicing the composite image into a plurality of quadrats, analyzing each of the quadrats, and estimating spatial interactions between cell types within the slide images. Alternatively or additionally, the method can further include creating a distance matrix using ecological distances to compare a region of interest (ROI) across tumors. Alternatively or additionally, the method can further include clustering on the distance matrix to identify a hidden structure in the composite image. Alternatively or additionally, the method can further include performing a multidimensional analysis on the distance matrix.

Referring now to FIG. 1A, an example method for aligning slide images is shown. This disclosure contemplates that the method can be performed using a computing device, for example, computing device 200 of FIG. 2. An automated software tool that aligns a series of whole slide tissue image slices, immunostained for different markers is described below. The algorithm can include the following series of sequential steps:

Step 101—Feature Detection and Matching: The features of each image are detected. Using these features, each image compared to all other images in the series by feature matching.

Step 102—Slide Ordering: Comparisons are used to build a distance matrix, D, reflecting the differences between each pair of images. Hierarchical clustering is performed on D, yielding a dendrogram. The leaves of the dendrogram, each corresponding to an image, are then optimally ordered. This order determines the position of the image in aligned image stack.

Step 103—Community Alignment: A graph with images as vertices, and edges connecting the most similar images, is created to perform the alignment. Communities are detected, and then images in each community are aligned to one another. This is followed by stitching the communities together. Community Stitching: The features of each community are pooled, and then images in each community are aligned to the images in the previous community by matching pooled features. Positions of matching features are then used find that transformation matrix that will warp images to those in the previous community.

Step 104—Registration: Images are now stacked and aligned. Dense optical flow is used to refine the alignment of each image to the previous image in the stack.

Step 105—Result: The transformation matrices found during this process can be used to align the original, unprocessed, versions of the images. The transformation matrices can also be scaled to work on resized (smaller or larger) versions of these images.

Figure 1B:
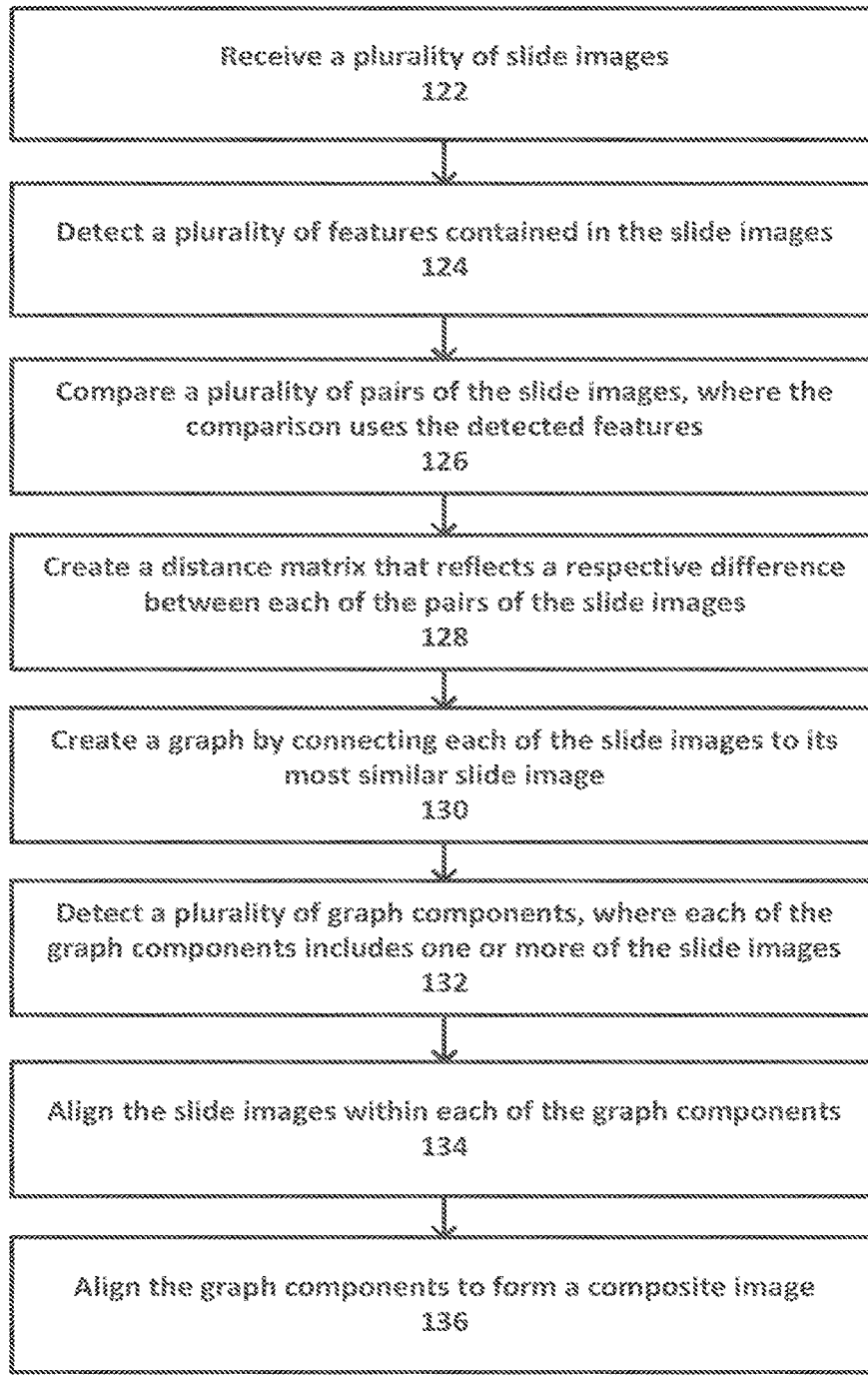
FIG. 1B is a flowchart illustrating another method for aligning slide images according to an implementation described herein.

Referring now to FIG. 1B, another example method for slide image registration is shown. This disclosure contemplates that the method can be performed automatically using a computing device such as computing device 200 of FIG. 2. This process is also described below in Example 2 (i.e., the VALIS technique). At step 122, a plurality of slide images are received, for example at a computing device. In some implementations, the slide images are whole slide images of tissue slices, for example, whole slide images that include images of tissue slices immunostained for different markers. Alternatively or additionally, the slide images are images of tissue stained with hematoxylin and eosin (H&E) stain. Alternatively or additionally, the slide images are images of tissue stained with multiple colors. Alternatively or additionally, the slide images are images of tissue that has undergone a plurality of stain and wash cycles. Optionally, in some implementations, the slide images are pre-processed so that the slide images look as similar as possible. The slide images can be processed to have a black background and lighter foreground highlighting tissue features. For example, in some implementations, the step of pre-processing the slide images can include normalizing an RGB slide image, and converting the RGB slide image to greyscale. In other implementations, the step of pre-processing the slide images can include converting an RGB slide image into a YUV colorspace. Alternatively or additionally, the slide images are optionally an unordered set. It should be understood that the pre-processing techniques described above are provided only as examples and that other techniques can be used.

At step 124, a plurality of features contained in the slide images are detected. Optionally, the detected features are KAZE features (e.g., $F_i$ in the VALIS technique described below). KAZE features are detected using a two-dimensional feature detection and description algorithm known in the art. Although KAZE features are provided as an example, this disclosure contemplates that the detected features can be other than KAZE features. At step 126, a plurality of pairs of the slide images are compared. The comparison uses the detected features. For example, the step of comparing a plurality of pairs of the slide images includes comparing each one of the slide images to each of the other slide images. At step 128, a distance matrix (e.g., n×n distance matrix, D in the VALIS technique described below) that reflects a respective difference between each of the pairs of the slide images is created. Optionally, if the slide images are an unorder set (i.e., slide series is unknown), the method further includes sorting the distance matrix by performing hierarchical clustering, for example, to yield a dendrogram. The dendrogram includes a plurality of leaves, each leaf corresponding to one of the slide images. Optionally, the method further includes performing optimal leaf ordering on the dendrogram.

At step 130, a graph (e.g., undirected graph G(V,E) in the VALIS technique described below) is created by connecting each of the slide images to its most similar slide image. At step 132, a plurality of graph components (e.g., community $C_m$ in the VALIS technique described below) is detected. This disclosure contemplates using community detection techniques known in the art. Such techniques are well known in the art and not described in further detail herein. Additionally, at step 134, the slide images within each of the graph components are aligned. The step of aligning the slide images within each of the graph components includes aligning two or more slide images within a graph component using at least one feature shared by the two or more slide images within the graph component. Further, at step 136, the graph components are aligned to form a composite image. The step of aligning the graph components to form a composite image includes pooling a respective set of features belonging to each of the graph components (e.g., composite feature set composed of all features in the community, $F_m = F_1^m \cup F_2^m \cup F_3^m$ ... for each community $C_m$ in the VALIS technique described below), and aligning two or more of the graph components using the respective sets of features belonging to the two or more of the graph components. Alternatively or additionally, a final alignment can be performed, for example by aligning each slide images to its previous slide image, to form the composite image. Alternatively or additionally, the alignment of the slide images can optionally be refined. The alignment can be refined using dense optical flow. This disclosure contemplates using optical flow techniques known in the art. Such techniques are well known in the art and not described in further detail herein. It should be understood that this disclosure contemplates using other refinement algorithms including, but not limited to, deformable registration methods.

As discussed below, the slide images can be aligned using a transformation matrix (e.g., transformation matrix, M in the VALIS technique described below). For example, a transformation matrix for aligning the slide images can be determined. The step of determining the transformation matrix optionally includes selecting the transformation matrix from a plurality of transformation matrices, the selected transformation matrix having the lowest alignment error.

The techniques described above have successfully been used to align serial slices of multi-color immunohistochemistry, images of the same tissue that have undergone serval stain/wash cycles, and tumor microarrays with low error. This disclosure contemplates that the techniques can be used clinically, for example, as a pathologists' tool for diagnostic purposes. In other words, this disclosure contemplates that the composite image (e.g., the aligned slide images) can optionally be further analyzed, for example, for diagnostic purposes. As an example, the composite image (e.g., the aligned slide images) may be used to assess the amount, and composition of, immune infiltrate into at tumor. Further, this digital pathology tool can also be used to compare tumor ecologies and spatial associations across groups, such as primary versus metastases, responders versus non-responders, grade, subtype, etc. Techniques and/or algorithms for digital pathology are known in the art and are therefore not described in further detail herein.

Example Computing Device

It should be appreciated that the logical operations described herein with respect to the various figures may be implemented (1) as a sequence of computer implemented acts or program modules (i.e., software) running on a computing device (e.g., the computing device described in FIG. 2), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 2:
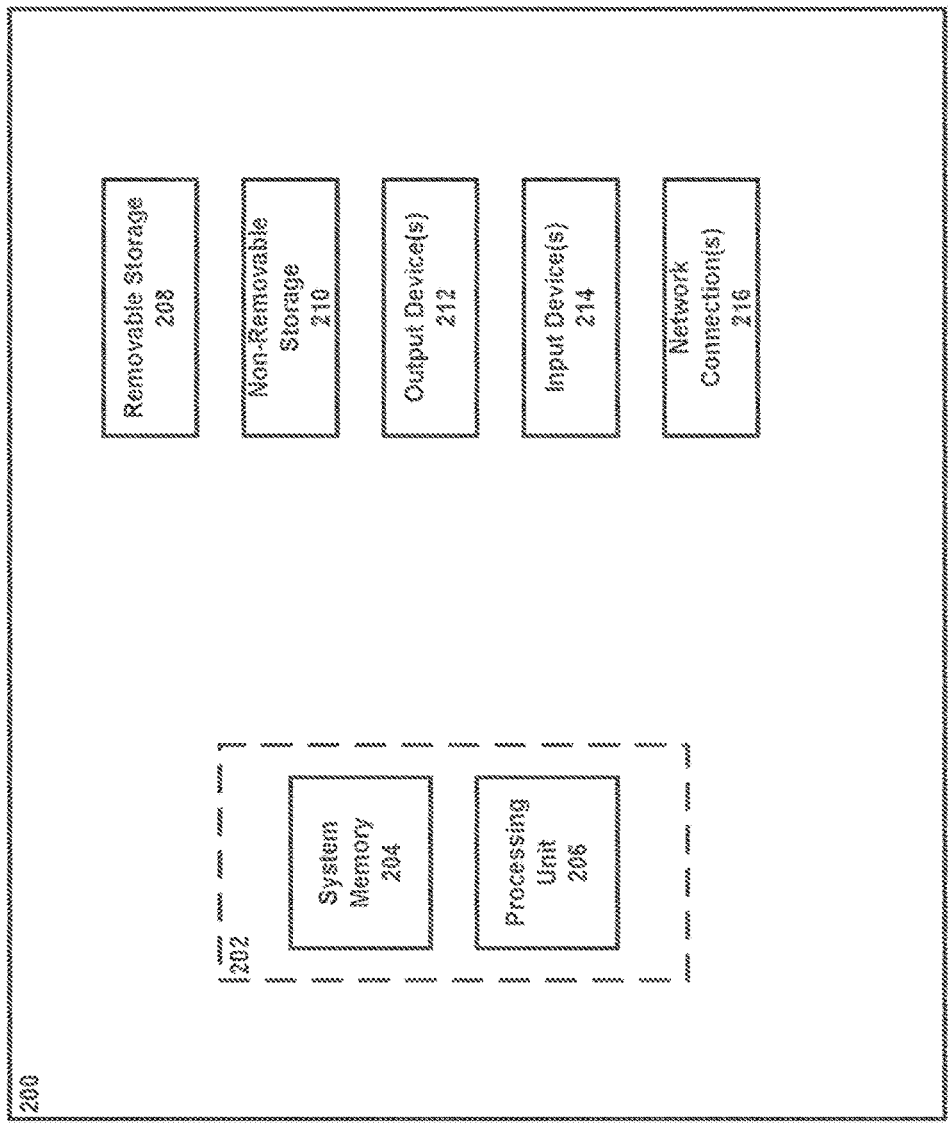
FIG. 2 is an example computing device.

Referring to FIG. 2, an example computing device 200 upon which embodiments of the invention may be implemented is illustrated. It should be understood that the example computing device 200 is only one example of a suitable computing environment upon which embodiments of the invention may be implemented. Optionally, the computing device 200 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 200 typically includes at least one processing unit 206 and system memory 204. Depending on the exact configuration and type of computing device, system memory 204 may be volatile (such as random access memory (RAM)), non-volatile (such as read-only memory (ROM), flash memory, etc.), or some combination of the two. This most basic configuration is illustrated in FIG. 2 by dashed line 202. The processing unit 206 may be a standard programmable processor that performs arithmetic and logic operations necessary for operation of the computing device 200. The computing device 200 may also include a bus or other communication mechanism for communicating information among various components of the computing device 200.

Computing device 200 may have additional features/functionality. For example, computing device 200 may include additional storage such as removable storage 208 and non-removable storage 210 including, but not limited to, magnetic or optical disks or tapes. Computing device 200 may also contain network connection(s) 216 that allow the device to communicate with other devices. Computing device 200 may also have input device(s) 214 such as a keyboard, mouse, touch screen, etc. Output device(s) 212 such as a display, speakers, printer, etc. may also be included. The additional devices may be connected to the bus in order to facilitate communication of data among the components of the computing device 200. All these devices are well known in the art and need not be discussed at length here.

The processing unit 206 may be configured to execute program code encoded in tangible, computer-readable media. Tangible, computer-readable media refers to any media that is capable of providing data that causes the computing device 200 (i.e., a machine) to operate in a particular fashion. Various computer-readable media may be utilized to provide instructions to the processing unit 206 for execution. Example tangible, computer-readable media may include, but is not limited to, volatile media, non-volatile media, removable media and non-removable media implemented in any method or technology for storage of information such as computer readable instructions, data structures, program modules or other data. System memory 204, removable storage 208, and non-removable storage 210 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 206 may execute program code stored in the system memory 204. For example, the bus may carry data to the system memory 204, from which the processing unit 206 receives and executes instructions. The data received by the system memory 204 may optionally be stored on the removable storage 208 or the non-removable storage 210 before or after execution by the processing unit 206.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

EXAMPLES

Example 1

The method (e.g., algorithm) described above with regard to FIG. 1A has successfully been used to align serial slices for several data sets with low error. This disclosure contemplates using the algorithm clinically as a pathologists' tool for diagnostic purposes. Further, this digital pathology tool can also be used to compare tumor ecologies and spatial cell-cell interactions across groups, such as primary vs metastases, responders vs non-responders, grade, subtype, etc.

For example, the method described above has successfully been used to align serial slices for several data sets with low error, where error is distance between matched features in the current slide and the previous slide (if alignment was perfect, these feature positions would be in exactly the same spots):

1a) 30 colorectal adenoma whole mount biopsies, each with 7 dual-stained slides, each approximately 2 um in thickness. The width and height of the images is 914 px and 408 px, with a median error of 2.1 pixels. The results were used to align larger versions of the images with widths and heights of 104568 px and 234042 px.

1b) 15 colorectal adenoma whole mount biopsies, each with 7 dual-stained slides, each approximately 2 um in thickness. The width and height of the images is 914 px and 408 px, with a median error of 2.5 pixels. The results were used to align larger versions of the images with widths and heights of 104568 px and 234042 px.

1c) 48 ductal carcinoma in situ (DCIS) whole mount biopsies, each with 7 dual-stained slides, each approximately 2 um in thickness. The width and height of the images is 914 px and 408 px, with a median error of 2.3 pixels. The results were used to align larger versions of the images with widths and heights of 104568 px and 234042 px.

1c) 48 DCIS whole mount biopsies, each with 7 dual-stained slides, each approximately 2 um in thickness. The width and height of the images is 914 px and 408 px, with a median error of 2.3 pixels. The results were used to align larger versions of the images with widths and heights of 104568 px and 234042 px.

1d) 3 oral cancer tumor microarrays (TMA), each with 9 single-stained slides. The width and height of the images is 632 px and 837 px, with a median error of 5 pixels.

1e) 1 breast cancer tumor microarrays (TMA), with 2 single-stained slides. The width and height of the images is 632 px and 837 px, with a median error of 0.8 pixels.

1f) 1 region of interest within a renal tissue sample that had 39 single-stained slides of different sizes. The median width and height of the images is 300 px and 194 px, with a median error of 1.8 pixels. The results were used to align larger versions of the images with widths and heights of 505 px and 300 px.

1g) 1 DCIS whole mount biopsy that had 13 single stained slides, each slice being approximately 20 um apart. The median width and height of the images is 651 px and 483 px, with a median error of 4.3 pixels. The results were used to align larger versions of the images with widths and heights of 26033 px and 19334 px.

2) For the DCIS whole mount biopsy, with 13 slides, the method has been shown to be more accurate than aligning images by hand. The median error rate for aligning by hand is 5.1 px, while with a median error using this automated method is 4.3 pixels.

3) The method has successfully determined the correct order of the renal tissue sample set that had 38 slides. It has also determined the correct order of a DCIS dataset that has 72 serial slices.

4) The method has been used to use isolate region of interests across all slices in the series. This is accomplished by drawing a mask on 1 image, and using information for the alignment to apply the mask to each original image.

Example 2

A method, Virtual Alignment of pathology Image Series (VALIS), is described in the example below. VALIS is able to align not only ROI, but whole mount biopsies, and tumor microarrays (TMA), all at full resolution. VALIS is also capable of not only aligning images stained with H+E, but also samples stained for multiple, spatially varying, markers. Furthermore, for large series of images, VALIS does not require that the images be ordered, as the technique is able to optimally order the slides, often times in the same order they were sliced from the sample. VALIS is also a totally automated and adaptive pipeline. All that is required is a set of pre-processed images, and the results are aligned images and collection of transformation matrices that can be used to align the image sets.

One application of VALIS is in the 3D reconstruction of samples. Additionally, the ability to align a series of slices stained for different markers, which is another application for VALIS, is even more powerful, as it creates the opportunity to describe the tumor ecology while maintaining spatial structure. Once aligned, established spatial statistics commonly used in other fields, such as ecology and demography, can be used to describe and better understand the tumor microenvironment. Thus, VALIS facilitates novel analyses of the tumor ecology that potentially identify crucial interactions involved in oncogenesis.

Mass cytometry is an exciting method that makes it possible to study the spatial distribution of different cell types and their interactions. While more accurate, mass cytometry does have its drawbacks: it is currently very expensive and thus potentially has a limited user base; it is typically used for small regions of tumors, such as a core from a TMA. VALIS, on the other hand, does not have these limitations, as it can be used to align the whole tumor. Perhaps even more importantly, VALIS can applied to existing datasets, which is useful because it may be that the samples of interest no longer exist, and thus cannot be multiplexed with mass cytometry. Further, VALIS can be used to define the whole tumor, not only small regions.

VALIS overcomes the challenges of working with large unordered image sets that have a wide variety of stains by performing the alignments on small groups of similar images, and then stitching those groups together in an optimal order. Given a set of greyscale preprocessed images (made to look as similar as possible), VALIS first detects the KAZE features of each image, and then determines the similarity/difference between each pair of images by matching their features, creating a distance matrix, D. If the order of slicing is unknown, hierarchical clustering is then performed on D, generating a dendrogram T. The order of slices is then be inferred by optimally ordering the leaves of T such that most similar images are adjacent to one another in the series.

The image series is broken up into small groups of similar image by performing community detection on the nearest neighbor graph G, where each image (i.e. a vertex in G) has an edge between it and its most similar image. Within each community, images are aligned to the subset of features shared by all images in that community. Next, each community is stitched to the previous community using the full set of features in each community. At this point the images are roughly aligned, and optical flow is used to refine the alignment between each image and the previous image in the series.

The output of VALIS is a transformation matrix for each image that aligns it to the previous image in the series. Such matrices can be scaled to work on images of different sizes, meaning that VALIS can quickly find the matrices using small versions of the images, and the resulting matrices scaled to align much larger, higher resolution, copies of the images. Given a set of reference coordinates, it is also possible to use the transformation matrices to slice out aligned regions from the very large (e.g., 8 gigabyte (GB) size or more) images produced by microscopes. Thus, VALIS gives one the ability to align and analyze the tumor at whatever the desired resolution.

VALIS was tested on datasets representing several common scenarios: series of H+E, multi-color IHC, whole mount biopsies, small ROI, sets where the slices are thin and close together, sets where the slides are thick and far apart, sets where different individuals conducted the staining on different slices in the same image series. The accuracy of VALIS was assessed by calculating the Euclidean distance between matching features in each image and its previous image in the series. If the images are perfectly aligned, this distance, i.e. error, would be 0. Errors can be calculated using the median distance between the 25 best matching features the across the two images (taking the top number avoids including outliers that may have minimal impact on the alignment), or the average displacement between the overlapping areas of the two images, as measured by dense optical flow. The ability of VALIS to optimally order slides was tested by taking an image set in which the slice order is known, shuffling the images, and the comparing the order estimated by VALIS to the known order.

The error rate of VALIS is low, often being well below 5 pixels (see the table in FIG. 3 and FIGS. 4A and 4B), and has been shown to be more accurate than aligning by hand (see FIG. 4A).

Figure 4A:
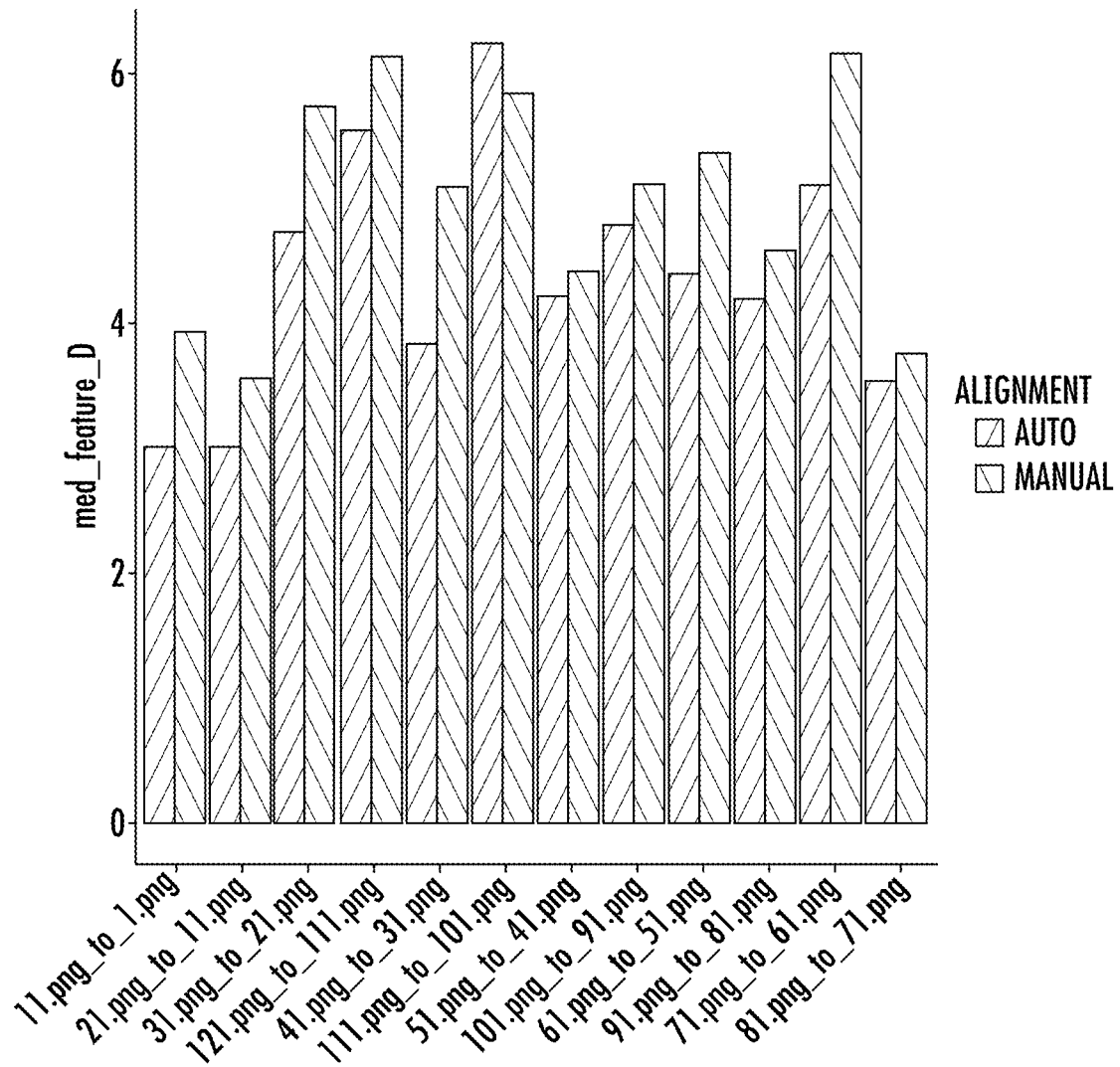
FIG. 4A is a graph illustrating the comparison of the accuracy of VALIS (auto) versus aligning by hand (manual).
Figure 4B:
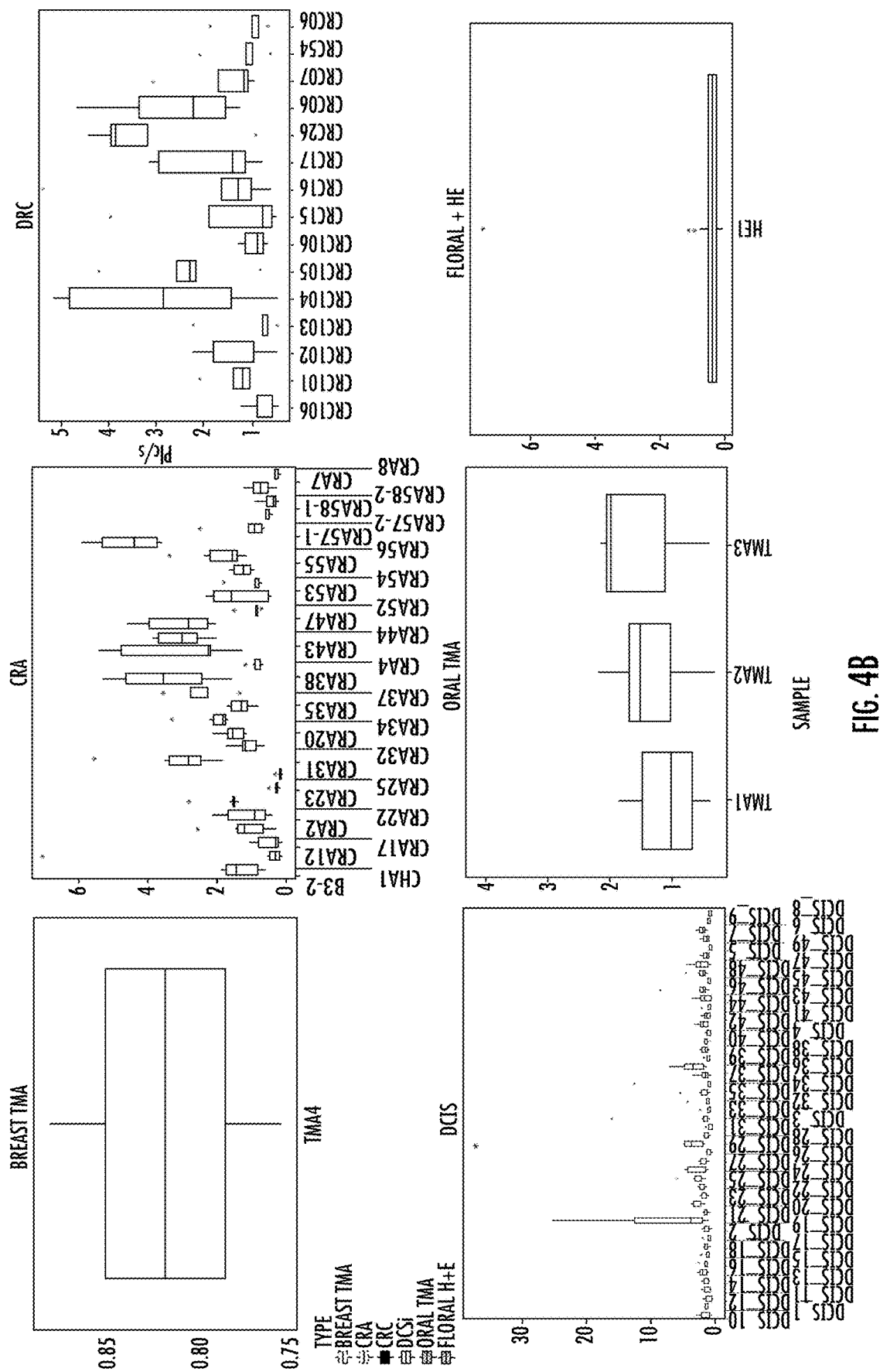
FIG. 4B is are graphs illustrating the alignment accuracy of different data sets.

FIG. 4A illustrates the comparison of the accuracy of VALIS (auto) versus aligning by hand (manual). The distance between matching features and the previous image in the series. In this image set, VALIS has lower error than when the same set of images are aligned by hand. FIG. 4A illustrates the alignment accuracy for different datasets. Y is the distance between matching features in each image and its previous image in the series. If alignments are perfect this value would be 0. 30 colorectal adenoma (CRA) whole mount biopsies, each with 7 dual-stained slides, each approximately 2 um in thickness. The dimensions of the images used to calculate error is 408×914 pixels. 15 colorectal carcinoma (CRC) whole mount biopsies, each with 7 dual-stained slides, each approximately 2 um in thickness. The dimensions of the images used to calculate error is 408×914 pixels. 48 ductal carcinoma in situ (DCIS) whole mount biopsies, each with 7 dual-stained slides, each approximately 2 um in thickness. The dimensions of the images used to calculate error is 408×914 pixels. 3 oral cancer tumor microarrays (TMA), each with 9 single-stained slides. The dimensions of the images used to calculate error is 632×837.

Ecological analysis. Distance matrix may reveal hidden structure, including, but not limited to, separating responders versus non-responders or how the tumors as wholes are different across tumor types.

Preprocessing:

The input to VALIS is a set of processed images. As KAZE features are used, these images should be greyscale, but may need to have additional modifications. The exact preprocessing steps will likely depend on the set of images, but two methods that have worked well with the test datasets are described below. However, the goal of the pre-processing step should be take make the images look as similar as possible and have a black background and lighter foreground highlighting tissue features.

The first method is to normalize each channel of the RGB image (truecolor image). This disclosure contemplates using RGB normalization techniques known in the art. Such techniques are well known in the art and not described in further detail herein. An example RGB normalization method is described in Wang et al., Robust image registration of biological microscopic images, Scientific Reports, 4:6050 EP, 2014. The normalized channels can then be recombined to create a normalized RGB image. This normalized RGB image is then converted to greyscale and optionally subjected to histogram equalization.

A second method is the convert the RGB image (truecolor image) to YUV colorspace, and then add the absolute values of the U and V channels. This disclosure contemplates using RGB to YUV conversion techniques known in the art. Such techniques are well known in the art and not described in further detail herein. The reasoning behind this method is to bring all pixels with color to the foreground, and push all greyscale pixels (e.g., those associated with empty areas of the slide or dust, dirt, etc. . . . ) to the background.

No matter the preprocessing method, the images provided to VALIS should not be too large. However, the transformation matrices found using the smaller images can be scaled to work on the full size images. Since this is based on feature matching, many motion models can be estimated, including, but not limited to, Euclidean, similarity, affine, or perspective.

Feature Detection:

The first step of the alignment pipeline is to detect the KAZE features of each image $I_i$, denoted by $F_i$. Each feature in the image has an original location of $F_i(x,y)$, but these positions change throughout the alignment processes. More specifically, the positions will change a total of four times: first when padding the image, moving the features $\dot{F}_i(x,y)$; next when aligning the features in each community, moving the features to $\ddot{F}_i(x,y)$; they are then again moved when the communities are stitched together, being warped to $\dddot{F}(x,y)$; arriving at their final location after refining the alignment. Note that the dot decorators indicate how many transformations the image and its features have undergone.

Build Distance Matrix:

The next step is to create a symmetric, hollow, n×n distance matrix, D, based on matching KAZE features between each pair of images. These distances, and associated similarities, are then used to optimally order the images and to build a graph of similar images. Brute force matching with crosschecking and random sample consensus (RANSAC) is used to match each feature $F_i$ to the other feature $F_j$. Information from these matches is then used to fill in D and quantify the similarity between images. Multiple distance/similarity metrics exist, but the best success has been had using either the number of matches, a, or Euclidean distance between $F_i$ and $F_j$. If using the number of matches, then $s_{ij}$=a similarly between the two images, is just the number of matches, while distance $$d_{ij} = \frac{1}{a}.$$

If using Euclidean distances, then $d_{ij}=\Sigma_{k=1}^{a}(f_{k,i}-f_{k,j})$ where k is the index of matching features, and $$s_{ij} = \frac{1}{1+d_{ij}}.$$

Optimally Order Images:

For datasets where the order of the series is known, then this step (i.e., image ordering) can be skipped. Otherwise, for datasets where the order of the series is unknown, or not particularly important, then the following steps are used to optimally order the images based on their similarity. Hierarchical clustering using single linkage is performed on the distance matrix, yielding a dendrogram, T. The leaves of T each correspond to an image in I and can be ordered such that similarity of adjacent leaves is maximized. Assuming that each tissue slice is more similar to the slice immediately above/below than to slices further away, this process recovers the same order in which the serial slices were taken. Thus, given ϕ, the optimal order of the leaves of T, the images can be ordered such that the similarity of adjacent images is maximized, yielding the sorted collection of images.

Construct Graph and Detect Communities:

Next, an undirected graph G(V,E) is constructed by connecting each image to its nearest neighbor in feature space. That is, each vertex in V(G) corresponds to an image and its feature set, with an edge between each image and its most similar image. In other words, there is an edge between image $I_i$ and the image $I_j$ associated with the maximum $s_{ij}$. The edge weights of this graph are equal to the similarity of the two images.

Community detection is then performed on G(V,E). This disclosure contemplates using community detection techniques known in the art. Such techniques are well known in the art and not described in further detail herein. An example community detection method is described in Blondel et al., Fast Unfolding of Communities in Large Networks, 2008. This disclosure contemplates using other methods of community detection, and the method does not seem to be too sensitive to the exact method chosen. Following community detection, each $V_i(G)$, and the associated $I_i$ and $F_i$, is assigned to its community, m. These communities are used to perform subsets of alignments, and then all communities stitched together in series.

Pad Images:

By this point, the order of images and their communities assignments have been determined. Given this structure, the process of finding the transformation matrices can begin. To avoid cropping, the first step is to estimate the dimensions of an image that can accommodate all warped images, and find the translation matrix that will pad each image to fit within those dimensions. This can be estimated by finding the maximum width and height of each image if it had been rotated 45 degrees, the amount of rotation that would most increase either dimension. For each image, its width and height after 45 degree rotation is $w_i \cos(45)+h_i \sin(45)$ and $w_i \sin(45)+h_i \cos(45)$, where $w_i$ and $h_i$ are the width and height of the un-rotated image, respectively. Therefore, $w_{max}$ and $h_{max}$ are the maximum width and height given these possible rotations. The translation that pads each image is then shown as:

$$P_i = \begin{bmatrix} 1 & 0 & 0.5(w_{max} - w_i) \\ 0 & 1 & 0.5(h_{max} - h_i) \\ 0 & 0 & 1 \end{bmatrix}.$$

After padding the image, the features have been shifted, which can be expressed as $\Psi(F_i(x,y),P_i) \rightarrow \dot{F}_i(x,y)$, where $\Psi((x,y),M)$ indicates warping points (x,y) using some transformation matrix, M. For simplicity, $\Psi$ will be used to indicate warping of feature points $F_i(x,y)$ or the $I_i$ itself.

Community Alignment:

The alignments can be performed in small batches using the communities detected as described above. The goal of this step is find features common to all images in community $C_m$, and then align all community members to those shared features. Doing this ensures that all images are aligned to the same set of points while also removing spurious matches by finding only those features common to all community members.

For each community $C_m$, all images are aligned to features in the single image that has the greatest median similarity to all other images in the community. This image may be considered the community's training image, and is denoted as $I_k^m$. The training features used for alignments are the subset of features associated with $I_k^m$ that all other images have matches with. In other words, the common feature set of the community is $F_k^m = F_{k,1}^m \cap F_{k,2}^m \cap F_{k,3}^m \ldots$. The matches between each $F_i$ and $F_k^m$ can then be used to find the transformation matrix, $\hat{A}_i^m$, that aligns image $I_i^m$ to the community training image, $I_k^m$. However, when finding $\hat{A}_i^m$ it is necessary to use the shifted positions of the features, $\dot{F}_i(x,y)$.

This transformation can be combined with the translation matrix found earlier, so that transformation aligns the images within an image with dimensions large enough to avoid cropping. This creates the transformation matrix $A_i^m = \hat{A}_i^m P_i$, which has the same effect of padding the image and then applying the rigid affine transformation to align the images in the community. The position of each image's features after padding and community alignment is thus $\Psi(F(x,y),A_i^m) \rightarrow \ddot{F}_i(x,y)$.

Community Stitching:

Given the order of slides, $\phi$, determined as described above, it is possible to stitch each community to the previous community in the series. This is accomplished by building a composite feature set composed of all features in the community, $F_m = F_1^m \cup F_2^m \cup F_3^m \ldots$ for each community $C_m$. Next, the composite feature set $F_m$ is matched to $F_{m-1}$, using RANSAC and cross-checking to remove poor matches.

At this point, the images in each community are aligned to one another, and thus the features are all be in similar positions. Therefore, the matrix $\hat{A}_m$ that warps features in $F_m$ to align with those in $F_{m-1}$ can be found using the positions of all features that match across the two communities. A special case is $C_1$, which is essentially being aligned to itself, and so $\hat{A}_{m-1}$ is the identity matrix. Am is then applied to every member of the community, aligning each feature in $C_m$ to the features in $C_{m-1}$.

The position of the warped features after community stitching is denoted by $\dddot{F}(x,y)$. Following stitching, the previous image's features have moved from where they were after community alignment, and so $\hat{A}_m$ is estimated using $\ddot{F}_m(x,y)$ and $\dddot{F}(x,y)$.

As before, the transformation matrices can be combined to have the same effect of padding the image, aligning it within its community, and then aligning it to the previous community. This is accomplished with $A_i^c = \hat{A}_c A_i^m$. Therefore, $\Psi(F(x,y),A_i^c) \rightarrow \dddot{F}(x,y)$ warps the original features to align $\dddot{F}$ with the images in its community and the previous aligned community.

Refining the Alignment:

When following the order of images defined by # as described above, warping each image $I_i$ with its $A_i^c$ yields $\Psi(I_i, A_i^c) = \ddot{I}_{i-1}$, and thus a series of roughly aligned images. The alignment of each image to the previous image in the series can be refined using dense optical flow, which estimates the displacement, (dx,dy), from the previous image, $\ddot{I}_i$, to the current image, $\ddot{I}_{i-1}$. This disclosure contemplates using optical flow techniques known in the art. Such techniques are well known in the art and not described in further detail herein. An example technique is DeepFlow. It should be understood that this disclosure contemplates using dense optical flow algorithms other than DeepFlow. The transformation matrix $A_i^f$ can then be estimated by finding the transformation that maps $(x,y) \rightarrow (x-dx, y-dy)$. After being warped, the final aligned image is denoted as $J_i$, i.e, $\Psi(\ddot{I}_{i-1}, A_i^f) \rightarrow J_i$. As each previous image in the series has been warped, $A_i^f$ is found by determining the displacement between $\ddot{I}_{i-1}$ to $J_{i-1}$, not $\ddot{I}_{i-1}$ and $\ddot{I}_i$. The final transformation matrix that aligns $I_i$ is thus $A_i = A_i^f A_i^c$, which is equivalent to padding the image, aligning it within its community, stitching it to the images in the previous community, and then refining its alignment to the previous image in the series.

Warping:

The transformation matrices estimated by VALIS can be scaled to work on resized copies of the images. For example, it is useful to find the matrices using smaller versions of the images, and then scale the transformation matrices to work on the larger image that needs to be aligned. This scaled transformation matrix can be found as $S_i A_i S_t^{-1}$, where $$S_i = \begin{bmatrix} s_x & 0 & 0 \\ 0 & s_y & 0 \\ 0 & 0 & 1 \end{bmatrix}$$

and $s_x$ and $s_y$ are the scaling factors between $I_i$ and the resized copy of the image.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for slide image registration, comprising:
   receiving a plurality of slide images;
   detecting a plurality of features contained in the slide images;
   comparing a plurality of pairs of the slide images, wherein the comparison uses the detected features;
   creating a distance matrix that reflects a respective difference between each of the pairs of the slide images;
   creating a graph by connecting each of the slide images to its most similar slide image in feature space, wherein each slide image is a vertex of the graph, and each connected slide image pair defines an edge of the graph;
   detecting a plurality of graph components using a community detection operation, wherein each of the graph components comprises one or more of the slide images;
   aligning the slide images within each of the graph components by aligning two or more slide images within each graph component using at least one feature shared by the two or more slide images within the respective graph component;
   refining the alignment of the two or more slide images by using an optical flow technique to estimate a displacement of each slide image from a previous slide image; and
   generating a composite image or series based, at least in part, on the aligned graph components.

2. The computer-implemented method of claim 1, wherein the detected features are KAZE features.

3. The computer-implemented method of claim 1, wherein comparing a plurality of pairs of the slide images comprises comparing each one of the slide images to each of the other slide images, wherein the distance matrix is created from the comparison.

4. The computer-implemented method of claim 1, further comprising sorting the distance matrix by performing hierarchical clustering.

5. The computer-implemented method of claim 4, wherein sorting the distance matrix by performing hierarchical clustering yields a dendrogram.

6. The computer-implemented method of claim 5, wherein the dendrogram comprises a plurality of leaves, each leaf corresponding to one of the slide images.

7. The computer-implemented method of claim 6, further comprising performing optimal leaf ordering on the dendrogram.

8. The computer-implemented method of claim 1, wherein aligning the slide images within each of the graph components comprises aligning two or more slide images within a graph component using at least one feature shared by the two or more slide images within the graph component.

9. The computer-implemented method of claim 1, wherein aligning the graph components to form a composite image or series comprises:
   pooling a respective set of features belonging to each of the graph components; and
   aligning two or more of the graph components using the respective sets of features belonging to the two or more of the graph components.

10. The computer-implemented method of claim 1, further comprising determining a transformation matrix for aligning the slide images.

11. The computer-implemented method of claim 10, wherein determining the transformation matrix comprises selecting the transformation matrix from a plurality of transformation matrices, the selected transformation matrix having the lowest alignment error.

12. The computer-implemented method of claim 10, further comprising aligning one or more of the slide images using the transformation matrix.

13. The computer-implemented method of claim 1, further comprising pre-processing the slide images.

14. The computer-implemented method of claim 13, wherein pre-processing the slide images comprises:
   normalizing an RGB slide image; and
   converting the RGB slide image to greyscale.

15. The computer-implemented method of claim 13, wherein pre-processing the slide images comprises converting an RGB slide image into a YUV colorspace.

16. The computer-implemented method of claim 1, wherein the slide images are whole slide images of tissue slices.

17. The computer-implemented method of claim 16, wherein the whole slide images include images of tissue slices immunostained for different markers.

18. The computer-implemented method of claim 1, wherein:
   the slide images are images of tissue stained with hematoxylin and eosin (H&E) stain;
   the slide images are images of tissue stained with multiple colors;
   the slide images are images of tissue that has undergone a plurality of stain and wash cycles; or
   the slide images are an unordered set of slide images.

19. A system, comprising:
   a processor; and
   a memory operably coupled to the processor, the memory having computer-executable instructions stored thereon that, when executed by the processor, cause the processor to:
   receive a plurality of slide images;
   detect a plurality of features contained in the slide images;

compare a plurality of pairs of the slide images, wherein the comparison uses the detected features;

create a distance matrix that reflects a respective difference between each of the pairs of the slide images;

create a graph by connecting each of the slide images to its most similar slide image in feature space, wherein each slide image is a vertex of the graph, and each connected slide image pair defines an edge of the graph;

detect a plurality of graph components using a community detection operation, wherein each of the graph components comprises one or more of the slide images;

align the slide images within each of the graph components by aligning two or more slide images within each graph component using at least one feature shared by the two or more slide images within the respective graph component;

refine the alignment by using an optical flow technique to estimate a displacement of each slide image from a previous slide image; and generating a composite image or series based, at least in part, on the aligned graph components.

\* \* \* \* \*